United States Patent
Burns et al.

(10) Patent No.: US 12,187,653 B2
(45) Date of Patent: Jan. 7, 2025

(54) SURFACE RETARDER FORMULATION AND METHOD FOR REPLICATING AN ACID ETCH OR SAND BLAST ASPECT ON CEMENTITIOUS MATERIAL

(71) Applicant: GCP Applied Technologies Inc., Cambridge, MA (US)

(72) Inventors: Elizabeth Burns, Windham, NH (US); David Geary, Hingham, MA (US); Dany Vincent, Sagy (FR); Huy The Bui, Dorchester, MA (US)

(73) Assignee: GCP Applied Technologies Inc., Malvern, PA (US)

( * ) Notice: Subject to any disclaimer, the term of this patent is extended or adjusted under 35 U.S.C. 154(b) by 1219 days.

(21) Appl. No.: 16/960,532

(22) PCT Filed: Jan. 8, 2019

(86) PCT No.: PCT/US2019/012680
§ 371 (c)(1),
(2) Date: Jul. 7, 2020

(87) PCT Pub. No.: WO2019/136435
PCT Pub. Date: Jul. 11, 2019

(65) Prior Publication Data
US 2021/0061721 A1  Mar. 4, 2021

Related U.S. Application Data
(60) Provisional application No. 62/614,650, filed on Jan. 8, 2018.

(51) Int. Cl.
*C04B 40/02* (2006.01)
*C04B 24/06* (2006.01)
(Continued)

(52) U.S. Cl.
CPC .......... *C04B 40/0295* (2013.01); *C04B 24/06* (2013.01); *C04B 24/243* (2013.01);
(Continued)

(58) Field of Classification Search
CPC ... C04B 40/0295; C04B 24/06; C04B 24/243; C04B 41/009; C04B 41/5323;
(Continued)

(56) References Cited

U.S. PATENT DOCUMENTS 3,655,591 A * 4/1972 Seiner .................. C08J 9/28
521/64
4,094,693 A * 6/1978 Knorre .................. C04B 28/14
106/778

(Continued)

FOREIGN PATENT DOCUMENTS

| EP | 0110075 | 6/1984 |
| EP | 1526120 | 4/2005 |

(Continued)

OTHER PUBLICATIONS

English Machine Translation of JP-3607010-B2 (Year: 2005).*
(Continued)

*Primary Examiner* — Jennifer A Smith
*Assistant Examiner* — Jeffrey Eugene Barzach
(74) *Attorney, Agent, or Firm* — Armstrong Teasdale LLP

(57) ABSTRACT

Disclosed are surface retarder composition and method for etching cementitious materials which achieve a desirable light "acid etch" look without using muriatic (hydrochloric) acid or sand blasting, removing the human health and environmental concerns. Formulations in accordance with embodiments disclosed herein are easier to remove from formwork or molds after demolding than conventional retarder paints. Surface retarders prevent the hydration of cement particles, which allows the uncured layer of paste (Continued)

Very light / No etch

Light Etch next to the form to be removed such as by washing with water or other fluids, or by brushing, revealing aggregates. Also disclosed are molded cement and concrete materials or articles exhibiting such light etch.

11 Claims, 4 Drawing Sheets

(51) Int. Cl.
    *C04B 24/24*     (2006.01)
    *C04B 41/00*     (2006.01)
    *C04B 41/53*     (2006.01)
    *C04B 41/72*     (2006.01)
    *C04B 103/20*     (2006.01)

(52) U.S. Cl.
    CPC ........ *C04B 41/009* (2013.01); *C04B 41/5323* (2013.01); *C04B 41/5353* (2013.01); *C04B 41/72* (2013.01); *C04B 2103/20* (2013.01)

(58) Field of Classification Search
    CPC . C04B 41/5353; C04B 41/72; C04B 2103/20; C04B 28/02; C04B 40/0039
    See application file for complete search history.

(56) References Cited

U.S. PATENT DOCUMENTS

| | | | |
|---|---|---|---|
| 4,124,406 A | 11/1978 | Knorre et al. | |
| 4,360,333 A | 11/1982 | Fox et al. | |
| 4,791,167 A * | 12/1988 | Saukaitis | C08F 220/22 |
| | | | 524/544 |
| 5,203,919 A | 4/1993 | Bobrowski et al. | |
| 5,634,972 A | 6/1997 | Pacanovsky et al. | |
| 5,932,344 A | 3/1999 | Ikemoto et al. | |
| 6,035,591 A | 3/2000 | Hicks et al. | |
| 6,114,033 A | 9/2000 | Ikemoto et al. | |
| 6,648,963 B2 | 11/2003 | Pasquier et al. | |
| 6,730,764 B1 | 5/2004 | Ikuta et al. | |
| 7,037,367 B2 | 5/2006 | Mauchamp et al. | |
| 8,097,296 B2 | 1/2012 | Vincent et al. | |
| 8,246,269 B2 | 8/2012 | Shaw et al. | |
| 2005/0081751 A1 * | 4/2005 | Mauchamp | C04B 41/72 |
| | | | 427/331 |
| 2006/0230987 A1 | 10/2006 | Burgals et al. | |
| 2007/0256594 A1 * | 11/2007 | Andriessen | C10M 163/00 |
| | | | 106/250 |
| 2009/0297702 A1 | 12/2009 | Vincent et al. | |
| 2011/0204283 A1 * | 8/2011 | Davis | C09C 1/3063 |
| | | | 106/490 |
| 2011/0135829 A1 | 9/2011 | Vincent et al. | |
| 2011/0257303 A1 * | 10/2011 | Moussios | C04B 28/08 |
| | | | 524/8 |
| 2013/0005860 A1 | 1/2013 | Dananche et al. | |
| 2013/0214448 A1 | 8/2013 | Pellerin et al. | |
| 2014/0374948 A1 | 12/2014 | Vincent et al. | |
| 2015/0191398 A1 | 7/2015 | Pucei et al. | |

FOREIGN PATENT DOCUMENTS

| | | | |
|---|---|---|---|
| HU | 181144 B * | 6/1983 | |
| JP | H0657195 A * | 3/1994 | |
| JP | H1045992 A * | 2/1998 | |
| JP | 2004018747 A * | 1/2004 | |
| JP | 3607010 B2 * | 1/2005 | |
| WO | 2007103751 | 9/2007 | |
| WO | 2014166625 | 10/2014 | |
| WO | 2019136435 | 7/2019 | |

OTHER PUBLICATIONS

English Machine Translation of HU-181144-B (Year: 1983).*
English machine translation of JP-H0657195-A (Year: 1994).*
English machine translation of JP-H1045992-A (Year: 1998).*
English machine translation of JP-2004018747-A (Year: 2004).*
Bishop, "Cement Hydration Inhibition with Sucrose, Tartaric Acid, and Lignosulfonate: Analytical and Spectroscopic Study," Ind. Eng. Chem. Res. 2006, 45, 7042-7049.
Zhang, "Influence of Tartaric Acid on Early Hydration and Mortar Perforamcne of Portland cement-calcium aluminate cement-anhydrite binder," Construction and Building Materials 112 (2016) 877-884.
Young, From PCT/ISA/210, International Search Report for PCT/US2019/012680, dated Apr. 15, 2019, 2 pages.
Young, Form PCT/ISA/237, Written Opinion of the International Searching Authority for PCT/US2019/012680, dated Apr. 15, 2019, 6 pages.

* cited by examiner

SURFACE RETARDER FORMULATION AND METHOD FOR REPLICATING AN ACID ETCH OR SAND BLAST ASPECT ON CEMENTITIOUS MATERIAL

FIELD OF THE INVENTION

Embodiments disclosed herein relate to surface retarders for cementitious compositions such as concrete, including precast concrete (concrete that is made on one place and used in another), masonry, mortar and pastes; such surface retarders are applied to the form or mold in which the cementitious composition will be cast and shaped, then unmolded. Embodiments also relate to the manufacture of cementitious materials exhibiting light etching mimicking that obtained by acid washing or sand blasting, and methods of light etching cementitious compositions. More specifically, embodiments disclosed herein relate to surface retarders which are capable of delivering a very light etch, by preventing the cure of a very small layer of cement particles, revealing only fine aggregate; cementitious articles exhibiting such light etch; and methods of light etching cementitious articles using such surface retarders. Current art does not provide surface retarders capable of such a fine etch, comparable to the finish achieved by washing cured concrete slabs with muriatic (hydrochloric) acid.

BACKGROUND

It is known to apply concrete surface retarders onto the inner surfaces of molds or formworks (which are essentially large-scale molds of assembled wooden boards or shuttering for making walls, foundations, etc.), and exposing the aggregates at the surface of the molded concrete shape or article. It is customary for commercial "in form" concrete surface retarder products to be provided in the form of solvent-based compositions. These products are typically sprayed or rolled onto the inner surfaces of the concrete mold or formwork. The cement paste portion of the concrete, which has been in contact with the surface retarder coating, can be removed through the use of pressurized water (spray) to expose aggregates that are embedded in the concrete beneath its removed surface.

Concrete that has been etched, not so deeply that the stones show, but only the sand shows, is desirable in architectural applications, for example. Current practice among precast concrete manufacturers is to cast the concrete, allow it to cure, and then transport the concrete to another area within the precast plant, where it is treated further. In one conventional method, the slab is washed with muriatic (hydrochloric) acid, and then rinsed with water. The use of large quantities of a hazardous material such as muriatic acid presents human health hazards and environmental risks; acid etching poses an inhalation hazard, is a skin irritant, corrodes steel equipment during overspray, and must be collected and neutralized using caustic such as sodium hydroxide. In addition, the precast manufacturer spends time and labor on the transportation and acid washing of the concrete article or part.

In another method, the slab is treated with light sandblasting to reveal a light etch. The use of high pressure sand blasting also presents human health hazards from the presence of crystalline silica, which is an inhalation hazard. In addition, the precast manufacture spends time and labor on the transportation and labor of sand blasting the concrete article or part.

Accordingly, there is increasing pressure on the manufacturers to mitigate the human health hazards. Similarly, it is desirable to mitigate environmental concerns associated with light etching and the like.

Although surface retarders and other techniques (casting aggregates on wet cement) are known in the art, none addresses the need for very light etches. For example, the use of an in-form retarder for precast concrete is known where the retardation is provided by a copolymer of vinyl acetate and crotonic acid. After removing the coating and paste which has been retarded on the surface, aggregates are thereby exposed, but still firmly embedded within the concrete. Other conventional retarders include sodium phosphate, phosphonic acid with citric acid, tartaric acid, alpha-hydroxy acids such as citric acid and its salts, hydrolyzing polyester to generate diacids which serve as surface retarders, polymeric surface retarders based on maleic anhydride copolymerized with vinyl monomers, polymers that have surface retarding functionality from acid-containing monomers, carbohydrates and acetylated amino phenol, aliphatic diacids, carboxylic acid retarding agents, malic, acetic, tartaric, citric, gluconic, heptagluconic or the sodium, potassium or calcium salts thereof suspended in vegetable oil, sugars such as sucrose, roferose, dextrose, maltose, lactose, xylose, fructose, mannose or glucose, esters of dicarboxylic acids in vegetable oil, such as tartaric and citric acid. It is noted that tartaric acid, when not otherwise described, means natural, or L-tartaric acid.

It would be desirable to provide a surface retarder composition and a method of etching cementitious material that eliminates the drawbacks of the prior art.

SUMMARY

In accordance with certain embodiments disclosed herein, a surface retarder formulation and method of etching cementitious materials are provided that accomplish the desirable light "acid etch" look without the use of muriatic (hydrochloric) acid or sand blasting, removing the human health and environmental concerns. Formulations in accordance with embodiments disclosed herein are easier to remove from formwork or molds used to form the concrete article after demolding than conventional retarder paints. Surface retarders prevent the hydration of cement particles, which allows the uncured layer of paste next to the form to be removed such as by washing with water or other fluids, or by brushing, revealing aggregates. Also disclosed are molded cement and concrete materials or articles exhibiting such light etch.

In some embodiments, a light etch is an etch that exposes no coarse aggregates (e.g., exposes only sand and no gravel or stone).

In certain embodiments, the active agent(s) in the surface retarder formulation are operative to retard setting of the hydratable cementitious binder after the surface retarder formulation has been applied onto an inner surface of the mold or form into which the cementitious composition is subsequently introduced. Suitable active agent(s) include mild acids such as oxalic acid, D,L-tartaric acid, citraconic acid or glutaric acid, which may be applied to one or more inner surfaces of the molds or forms by any suitable means, including rolling, spraying, troweling or brushing, and allowed to dry. In some embodiments, the surface retarder formulation is a liquid. In certain embodiments, the active agent(s) may be formulated with a resin or polymer and a suitable solvent. The solvent evaporates, leaving a dried coating. The resin or polymer provides strength to the coating, enabling application to, for example, plastic concrete without disturbing the coating. Suitable molds or forms may be made of wood, steel, polyurethane or other resins, fiberglass or other composites typically used in precast concrete. In some embodiments, the cementitious material, such as self-consolidating concrete that is preferably used in the precast industry, is poured or otherwise introduced onto or into the coated forms, and allowed to cure. After curing, the material is demolded and the surface may be washed with water or other fluids, or brushed, removing a very thin layer of paste, revealing fine aggregate (e.g., sand) but no stone, thereby providing the desired aesthetic surface. Typically visible features are on the order of 0.5-1 mm in diameter.

In certain embodiments, the retarder formulation uses a safer, less flammable (combustible) solvent than conventional retarder formulations. In some embodiments, the active agent in the retarder formulation is synthetic tartaric acid present in an amount effective to achieve the desired light etch.

In a first exemplary embodiment, a surface retarder composition is provided that comprises a resin or polymer, an aliphatic solvent that does not dissolve the resin or polymer fully and has a narrow range of composition as determined by gas chromatography; and at least one surface retarder active agent having solubility and cement binding values, which, when plotted with solubility values on the x-axis and cement binding values on the y-axis and displayed in log scale, lie closer to the origin than the line $y=5000e^{-0.236x}$. The origin of an x-y plot is the point x=0 and y=0. For plots that use a log scale on the vertical axis, since there is no 0 on the log scale, the origin refers to the point where the horizontal and vertical axes cross in a specific figure. The terminology "solubility values" and "cement binding" (or "oxygen-to-carbon ratio"), when viewed graphically, are thus understood to define a relationship. The resin or polymer may be a resin or polymer with an acid value greater than 100 mg KOH/g polymer, such as polymerized or dimerized rosins and plant-based resins.

The term "surface retarder active agent" as used herein refers to an organic or inorganic molecule which binds cations and has a retarding effect on the hydration of cement particles.

In a first aspect of the first exemplary embodiment above, the surface retarder active agent has solubility and cement binding values, which, when plotted with solubility value on the x-axis and cement binding value on the y-axis and displayed in log scale, lie closer to the origin than the line $y=5000e^{-0.236x}$; and, more preferably, lie closer to the origin than the line $y=4000e^{-0.236x}$; and, most preferably, lie closer to the origin than the line $y=3000e^{-0.236x}$.

In a second exemplary embodiment, which may be based on the first exemplary embodiments described above, the solvent may be chosen from mineral spirits, white spirits, and VM&P naptha.

In a third exemplary embodiment, which may be based on any of the first through second exemplary embodiments described above, the solvent is chosen from odorless mineral spirits.

In a fourth exemplary embodiment, which may be based on any of the first through third exemplary embodiments described above, the at least one surface retarder active agent comprises at least one organic diacid compound having solubility values and cement binding values, which, when plotted with solubility value on the x-axis and cement binding value on the y-axis, lie above the line $y=200e^{-0.236x}$.

In a first aspect of the fourth exemplary embodiment, the at least one surface retarder active agent comprises an organic diacid compound having solubility values and cement binding values, which, when plotted with solubility value on the x-axis and cement binding value on the y-axis, more preferably fall below the line $y=5000e^{-0.236x}$ and above the line $y=200e^{-0.236x}$; and, more preferably, fall below the line $y=4000e^{-0.236x}$ and above the line $y=250e^{-0.236x}$; and, most preferably, fall below the line $y=3000e^{-0.236x}$ and above the line $y=300e^{-0.236x}$.

In a fifth exemplary embodiment, which may be based on any of the first through fourth exemplary embodiments described above, the at least one surface retarder active agent comprises an organic diacid compound chosen from oxalic acid, D,L-tartaric acid, citraconic acid, glutaric acid, phthalic acid, mesaconic acid, methylmalontic acid, adipic acid, succinic acid, itaconic acid, and combinations thereof.

In a sixth exemplary embodiment, which may be based on any of the first through fifth exemplary embodiments described above, the at least one surface retarder active agent is chosen from oxalic acid, D,L-tartaric acid, citraconic acid, glutaric acid, aconitic acid, boric acid, and combinations thereof.

In a seventh exemplary embodiment, which may be based on any of the first through sixth exemplary embodiments described above, the at least one surface retarder active agent comprises at least one organic diacid compound that is a co-crystallized 1:1 mixture of L-tartaric and D-tartaric acid.

In an eighth exemplary embodiment, which may be based on any of the first through seventh exemplary embodiments described above, the resin or polymer is a dimerized or polymerized gum rosin.

In a ninth exemplary embodiment, which may be based on any of the first through eighth exemplary embodiments described above, the resin is a plant-based resin.

In a tenth exemplary embodiment, which may be based on any of the first through ninth exemplary embodiments described above, the at least one surface retarder active agent comprises at least one organic diacid compound having solubility values and oxygen-to-carbon ratio values, which, when plotted with solubility on the x-axis and oxygen-to-carbon ratio on the y-axis, lie closer to the origin than the line $y=-1.75x+3.2$.

In a first aspect of the tenth exemplary embodiment, at least one organic diacid compound has solubility and oxygen-to-carbon ratio, which, when plotted with solubility on the x-axis and oxygen-to-carbon ratio on the y-axis, preferably lie closer to the origin than the line $y=-0.075x+3.2$; and, more preferably, closer to the origin than the line $y=-0.075x+3.1$; and, most preferably, closer to the origin than the line $y=-0.075x+3.0$.

In an eleventh exemplary embodiment, which may be based on any of the first through tenth exemplary embodiments described above, the solubility and cement binding value of the at least one organic diacid compound, when plotted with solubility on the x-axis and cement binding is plotted on the y-axis displayed in log form, lie further from the origin than the line $y=-0.075x+2$; more preferably, lie above the line $y=-0.075x+2.2$; and, most preferably, lie above the line $y=-0.075x+2.5$.

In a twelfth exemplary embodiment, which may be based on any of the first through eleventh exemplary embodiments described above, provided is a concrete article (or concrete part or substrate) having a surface with an acid-like etch which is made by using a surface retarder as described above in any of the first through eleventh example embodiments.

In an exemplary surface retarder formulation, which could be based upon any of the foregoing example embodiments disclosed herein, the surface retarder composition can comprise 0.1 to 25% organic acid, 5 to 60% resin or polymer, and 10 to 90% solvent (all weights herein based on total weight of composition).

In other exemplary embodiments, molded cement and concrete materials are manufactured, including precast concrete articles such as panels, walls or other shaped structures, using a surface retarder formulation that comprises a resin or polymer, a solvent, and at least one surface retarder active agent (e.g., organic diacid compound) in accordance with any of the exemplary embodiments described above.

In a thirteenth exemplary embodiment, which may be based on any of the first through twelfth example embodiments above, the invention provides a method of etching the surface of a cementitious composition, comprising: providing a cementitious composition having a surface to be etched, the cementitious composition comprising a hydratable cement binder and water; the cementitious composition further comprising at least one aggregate; providing a mold; applying a surface retarding composition to the mold, the surface retarding composition comprising a resin or polymer, an aliphatic solvent that does not dissolve the resin fully, and at least one surface retarder active agent having solubility and cement binding values, which, when plotted with solubility on the x-axis and cement binding on the y-axis displayed in log scale, lies closer to the origin than the line $y=5000e^{-0.236x}$; introducing the cementitious composition to the mold in an uncured state and allowing the cementitious composition to cure; removing the cured cementitious composition from the mold; and removing a portion of the surface of the cementitious composition coated with the surface retarding composition, thereby revealing an etched portion in the cementitious composition comprising the at least one aggregate.

In a fourteenth exemplary method, which may be based on any of the first through thirteenth example embodiments above, the at least one surface retarder active agent has solubility and cement binding values, which, when plotted with solubility values on the x-axis and cement binding values on the y-axis displayed in log scale, lies further from the origin than the line $y=200e^{-0.236x}$.

In a fifteenth exemplary method, which may be based on any of the thirteenth through fourteenth exemplary embodiments described above, the at least one aggregate is chosen from sand, crushed gravel, stone, and mixtures thereof.

In a sixteenth exemplary method, which may be based on any of the first through fifteenth exemplary embodiments described above, the coating is removed with a jet of pressurized water.

In a seventeenth exemplary method, which may be based on any of the first through sixteenth exemplary embodiments described above, the cementitious composition having the revealed etched portion comprises a hydratable cementitious binder comprising Portland cement, masonry cement, or mortar cement.

In an eighteenth exemplary method, which may be based on any of the first through seventeenth exemplary embodiments described above, the surface retarder composition is applied to the mold by spraying.

In a nineteenth exemplary method, which may be based on any of the first through eighteenth exemplary embodiments described above, the surface retarder composition is applied to the mold by brushing.

In a twentieth exemplary method, which may be based on any of the first through nineteenth exemplary embodiments described above, the at least one surface retarder active agent comprises an organic diacid compound chosen from oxalic acid, D,L-tartaric acid, citraconic acid, glutaric acid, aconitic acid, boric acid, and combinations thereof.

In an twenty-first exemplary method, which may be based on any of the first through twentieth embodiments described above, provided is a method of etching the surface of a cementitious composition, comprising: providing a cementitious composition having a surface to be etched, the cementitious composition comprising a hydratable cement binder and water; the cementitious composition further comprising at least one aggregate; providing a mold; applying a surface retarding composition to the mold, the surface retarding composition consisting essentially of a resin or polymer, an aliphatic solvent that does not dissolve the resin fully, and at least one organic diacid compound which binds cations and which has solubility and oxygen-to-carbon values, which, when plotted with solubility on the x-axis and oxygen-to-carbon ratio on the y-axis, lie closer to the origin than the line $y=-0.075x+3.2$; introducing the cementitious composition to the mold in an uncured state and allowing the cementitious composition to cure; removing the cured cementitious composition from the mold; and removing a portion of the surface of the cementitious composition coated with the surface retarding composition, thereby revealing an etched portion in the cementitious composition comprising the at least one aggregate.

In a twenty-second exemplary embodiment, which may be based on any of the first through twenty-first exemplary embodiments described above, the at least one organic diacid compound is chosen from oxalic acid, D,L-tartaric acid, citraconic acid, glutaric acid, or combinations thereof.

In a twenty-third exemplary embodiment, which may be based on any of the first through twenty-second exemplary embodiments described above, the at least one aggregate is chosen from sand, crushed gravel, stone, and mixtures thereof.

In further example embodiments, methods of etching the surface of a cementitious composition are disclosed, comprising: providing a cementitious composition having a surface to be etched, the cementitious composition comprising a hydratable cement binder and water (e.g., in an amount sufficient to initiate hydration of the hydratable cement binder) and further comprising at least one aggregate; providing a mold; applying a surface retarding composition to the mold, the surface retarding composition comprising a resin or polymer, an aliphatic solvent that does not dissolve the resin fully, and at least one organic diacid compound which binds cations and which has solubility and oxygen-to-carbon values, which, when plotted with solubility on the x-axis and oxygen-to-carbon ratio on the y-axis, lies closer to the origin than the line $y=-1.75x+2.75$; introducing the cementitious composition to the mold in an uncured state and allowing the cementitious composition to cure; removing the cured cementitious composition from the mold; and removing a portion of the surface of the cementitious composition coated with the surface retarding composition, thereby revealing an etched portion in comprising the at least one aggregate. Suitable aggregates include sand, crushed gravel, stones and mixtures thereof.

Further exemplary features are described hereinafter.

DETAILED DESCRIPTION

Figures 1A, 1B, 1C, 1D:
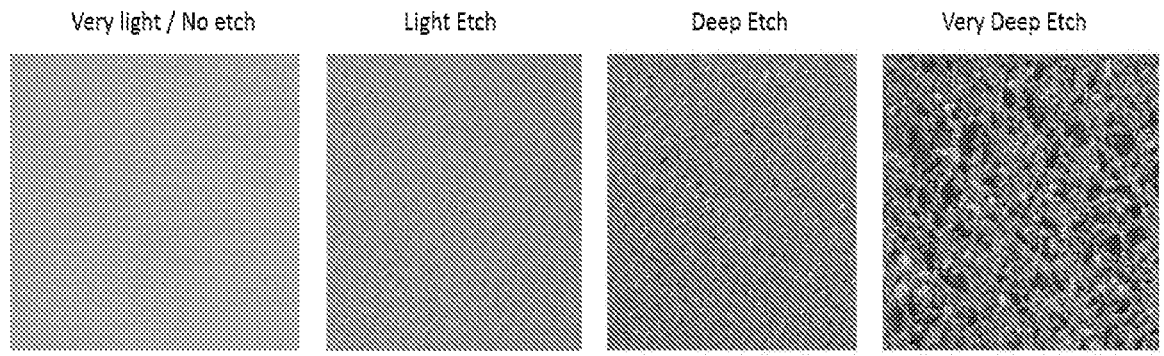
FIGS. 1A, 1B, 1C and 1D are photographs of various acid etches of cementitious material.

A more complete understanding of the compositions and methods disclosed herein can be obtained by reference to the accompanying drawings. The figures are merely schematic representations based on convenience and the ease of demonstrating the present disclosure, and are, therefore, not intended to indicate relative size and dimensions of the devices or components thereof and/or to define or limit the scope of the exemplary embodiments.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

The term "concrete" as used herein will be understood to refer to materials including a cement binder, e.g., a hydratable cement binder (e.g., Portland cement optionally with supplemental cementitious materials such as fly ash, granulated blast furnace slag, limestone, or other pozzolanic materials), water, and aggregates (e.g., sand, crushed gravel or stones, and mixtures thereof), which form a hardened building or civil engineering structure when cured. The concrete may optionally contain one or more chemical admixtures, which can include water-reducing agents, mid-range water reducing agents, high range water-reducing agents (called "superplasticizers"), viscosity modifying agents, corrosion-inhibitors, shrinkage reducing admixtures, set accelerators, set retarders, air entrainers, air detrainers, strength enhancers, pigments, colorants, fibers for plastic shrinkage control or structural reinforcement, and the like. Concrete is made from cement, water, and aggregates, and optionally one or more chemical admixtures. Such chemical admixtures are added to improve various properties of the concrete, such as its rheology (e.g., slump, fluidity), initiation of setting, rate of hardening, strength, resistance to freezing and thawing, shrinkage, and other properties.

The term "cementitious" may be used herein to refer to materials that comprise Portland cement or which otherwise function as a binder to hold together fine aggregates (e.g., sand) and coarse aggregates (e.g., crushed gravel, stone) which are used for constituting concrete. The cementitious compositions may be formed by mixing required amounts of certain materials, e.g., hydratable cement, water, and fine and/or coarse aggregate, as may be applicable to make the particular cement composition being formed.

The term "aggregate" as used herein shall mean and refer to sand, crushed gravel or stone particles, for example, used for construction materials such as concrete, mortar, and asphalt, and this typically involves granular particles of average size between 0 and 50 mm. Aggregates may comprise calciferous, siliceous or siliceous limestone minerals. Such aggregates may be natural sand (e.g., derived from glacial, alluvial, or marine deposits which are typically weathered such that the particles have smooth surfaces) or may be of the "manufactured" type, which are made using mechanical crushers or grinding devices.

The term "mold" refers to forms or shaped devices that function to shape the cementitious material or concrete into panels, blocks, paver units, or other construction units; while "formwork" or "form" is essentially a large mold, assembled using wood boards and panels for example, designed for forming larger construction structures such as foundations, walls, tunnels, and the like.

As used herein, the phrase "consisting essentially of" limits the scope of a claim to the specified materials or steps and those that do not materially affect the basic and novel characteristics of the claimed subject matter. The term permits the inclusion of substances which do not materially affect the basic and novel characteristics of the composition, formulation or method under consideration. Accordingly, the expressions "consists essentially of" or "consisting essentially of" mean that the recited embodiment, feature, component, etc. must be present and that other embodiments, features, components, etc., may be present provided the presence thereof does not materially affect the performance, character or effect of the recited embodiment, feature, component, etc. The presence of impurities or a small amount of a material that has no material effect on a composition is permitted. Also, the intentional inclusion of small amounts of one or more non-recited components that otherwise have no material effect on the character or performance of a composition is still included within the definition of "consisting essentially of."

In accordance with certain embodiments, a surface retarder formulation is provided, which comprises a surface retarder active agent (e.g., an organic or inorganic molecule which that binds cations), a resin or polymer, and a solvent for the surface retarder active agent and the resin or polymer. Other optional components of the retarder formulation in some embodiments include pigments, such as inorganic metal oxides such as zirconium or titanium oxides (e.g., titanium dioxide), iron (e.g., iron oxide) or organic pigments such as phthalocyanine or azo pigments. Soluble dyes can be used. Any colorant may be used, for instance, those listed in the Color Index maintained by Society of Dyers and Colourists and the American Association of Textile Chemists and Colorists. The colorants can be used in the surface retarder coating composition in the amount of 1 to 10 percent, and more preferably 2 to 5 percent, based on total dry weight of the surface retarder coating composition.

Thickeners such as fumed or precipitated metal oxides, clays such as bentonite or montmorillonite, associative thickeners such as those sold by Dow or BYK also may be used. Suitable thickeners which could help to achieve a desired rheology for improved application include polysaccharide biopolymers such as diutan gum, welan gum, and xanthan gum, as well as cellulosic derivatives, guar gum, and starch. Other water soluble or dispersible resins could be used such as polyvinylpyrrolidones, polyvinylalcohols, or (dried) emulsion resins. Cellulosic derivatives also may be used. The thickeners could be used in the surface retarder coating compositions in the amount of 0.5 to 10 percent, more preferably 2 to 8 percent, based on total dry weight of the coating composition.

Other components may be used in amounts of 1-10% to provide a small amount of waterproofing, or corrosion inhibition or prevention of coating defects. Suitable components include lanolin or other waxes such as carnauba wax, fatty acids and their salts, esters or other derivatives, polyethylene and other petroleum waxes, and polydimethyl siloxane.

Coating aids in amounts typically around 0.1 to 2% by weight based on the weight of the surface retarder formulation may be used to promote flowing and leveling remove defects such as bubbles, orange peel, ripples, cracks or splits are sold by BYK (e.g., polyether-modified polydimethylsiloxane additives such as BYK-333 and BYK-331 additives; polyacrylate such as BYK-356 additive; ANTI-TERRA® U additive which is a solution of a salt of unsaturated polyamine and low-molecular weight acidic polyesters; and DISPERBYK® 107 additive, which is a solution of a hydroxy-functional carboxylic acid ester with pigment affinic groups; additives sold by TEGO, such as polyether siloxane copolymer such as TEGO® WET 270; formulations of an organically modified siloxane gemini surfactant such as TEGO® Twin 4200; ketone-aldehyde condensation resins such as TEGO® VariPlus AP and TEGO® VariPlus TC; non-ionic wetting agents such a SURFYNOL 104A; others may be incorporated into the formulation to produce a smooth level coating on the concrete form.

Organic acids are known to act as retarders for cementitious materials. The mechanism is believed to be very stable complexation with the cationic surface. In order for a diacid to form a very stable complex with a cation, or cationic surface, it must have both functional acid groups on the same side of the carbon chain of the molecule, in a cis conformation, or be able to rotate into such a cis conformation. Succinic acid is an example of a diacid that can exhibit a cis conformation, as contrasted with fumaric acid, which can exhibit a trans conformation. Trans diacids, like monoacids, can bind to cations, but do not form such a stable complex, and are not as useful in retarding cement hydration.

Regarding surface retarder active agents, the present inventors found that considering solubility is helpful in certain embodiments.

For example, when the surface retarder active agent is applied to the concrete form, it needs to dissolve into the film of water at the surface of the cementitious material, because this helps it to migrate to the cement particles before hydration of the cement particle has progressed significantly. On the other hand, if the surface retarder active agent is overly soluble, the etch will be deeper than desired.

The present inventors believe that one aspect that can affect solubility is stereochemistry. For tartaric acid, the D form is left-handed when described by the very specific set of rules, and the L form is right-handed. The optical rotation of L(+) tartaric acid is $[\alpha]^{20}=12$; that of D(-) is -12. L(+) tartaric acid is the "natural" form, derived from, for example, wine barrels. The D(-) is called "unnatural" tartaric acid and is made specifically in the laboratory with stereo-specific methods known to those skilled in the art. Molecules made by organic synthetic methods are typically a racemic mixture of the two forms (unless stereo-specific methods are used). The racemic mixture has no optical rotation. Tartaric acid has two chiral carbons, the L(+) and D(-) forms have either two left-handed or two right-handed carbons. There is one more form that has one left-handed and one right-handed carbon, and this is the meso form. In general, racemic co-crystals are believed to have lower solubilities than their entiomerically pure forms (Wallach's Rule, after Wallach, O. Liebigs Ann Chem 1895, 286, 90-142) although the validity of the generalization has been debated relatively recently, (Brock, C. P.; Schwizer, W. B.; Dunitz, J. D. *J. Am. Chem. Soc*, 1991, 113, 9811-9820), the observation certainly holds true for tartaric acid. The synthetic version, a racemic co-crystal (i.e., a mixture of about 50 percent of the D(-) isomer and about 50 percent of the L(+) isomer), has much less solubility than either the D(-) or the L(+).

Another characteristic helpful in forming light etches for organic diacids, in accordance with embodiments disclosed herein, is oxygen-to-carbon content which the present inventors believe correlates with retardation efficiency (or cement binding). More oxygen in the molecule, especially in the form of hydrogen-bond donors such as hydroxyl groups, provides ancillary binding sites and strengthens the complex. Suitable oxygen-to-carbon ratios are about 0.5 to 2.5.

Suitable acids include oxalic acid, D,L-tartaric acid, citraconic acid, glutaric acid, phthalic acid, mesaconic acid, methylmalontic acid, adipic acid, succinic acid, itaconic acid, or combinations of any of the foregoing. Particularly preferred acids are oxalic acid, D,L-tartaric acid, citraconic acid and glutaric acid. In certain embodiments, the organic acids are present in the surface retarder formulation at a level of about 1 to 25 weight percent, preferably from 3 to 15 weight percent, and most preferably from 6 to 8 weight percent.

The resin or polymer in the surface retarder formulation provides strength, but is typically not as high in molecular weight, or as strong, as polyethylene or polystyrene, for example. Suitable resins or polymer are those with acid values of greater than 100 mg KOH/g of polymer. Resins with acid numbers greater than 120 mg KOH/g polymer are preferred, and greater than 140 mg KOH/g polymer are particularly preferred. Typical resins are natural products derived from plants. Examples are alkyds, tall oil rosins and gum rosins. Polymerized or dimerized rosins are preferred, such as those available from Eastman Chemical Company such as DYMEREX™ modified rosin, FPR-140 polymerized rosin from Foreverest Resources, ARDYME™ R-140 polymerized rosin from Arakawa Chemical Industries, Inc., K10 from DRT; rosins from Baolin, P140 rosin from Summit Pinechem, and rosins from Granel SA. Suitable materials have a polycyclic terpenoid structure. Other suitable resins or polymers include styrene maleic anhydride polymers such as SMA© 1440, which has an acid number of 165-205 mgKOH/g polymer and weight-average molecular weight of 7000 g/mole, SMA® 17352 which has an acid number of 252-285 and a weight-average molecular weight of 7000, and SMA® 2625 which has an acid number of 200i-240 and a weight-average molecular weight of 10,500. SMA® additives are sold by the Cray Valley subsidiary of Total. Other suitable resins or polymers include styrene acrylic acid copolymers such as JONCRYL® 67 polymers with an acid number of 231 and a molecular weight of 1300, JONCRYL® 683 polymers with an acid number of 165 and a molecular weight of 8000, and JONCRYL® 693 polymers with an acid number of 205 and a molecular weight of 6000, acrylic acid copolymers, polypeptides, and urethane polymers with acrylic side groups. In certain embodiments, the resin or resins or polymer are present at a level of about 5 to 60 percent by weight, preferably from 20 to 40, and most preferably from 25 to 30 percent by weight of the surface retarder formulation. Polymers that react with caustic water, such as pore water from cement, to form species with acid numbers greater than 100 mg KOH/g polymer also may be used, such as polyesters and polyacrylic esters, which cleave the ester linkage giving acid groups.

The solvent functions as a carrier, to provide a low viscosity for application. Suitable viscosities include viscosities in the range of 5-100 cPs, more preferably 5-50 cPs, most preferably 10-30 cPs. Solvent/resin interaction is key to product performance. A non-solvent (in polymer terms, see for example Orwall, Robert Solubility of Polymers, in The Encyclopedia of Polymer Science and Engineering, Kroschwitz, J. I. ed. John Wiley & Sons, v. 15, page 380) will require the resin to be ground and prone to settling. A good solvent will be hard to remove from the resin, since it will associate closely at the molecular level. The right solvent will dissolve poorly/disperse the resin, and evaporate quickly. Industrial solvents are often blends of molecules, the product of a distillation process. Distillation will separate materials based on boiling points. Surprisingly, the present inventors have found that poor solvents with a narrow range of composition, as measured by retention time on a gas chromatograph, have the right qualities to provide surface retarder compositions with the characteristics necessary to provide the desired light etch in accordance with the objections disclosed herein Retention times from about 3 to about 10 minutes, using the method described in Example 5 are preferred, while those with broader ranges of retention time, for example from about 5 to 13 or about 6 to 17 minutes are not well-suited to this application. Another way to characterize the solubility of the solvent is by visual inspection of the resin or polymer in the solvent, as shown in FIGS. 4A, 4B and 4C. In FIG. 4A, the resin is in a non-solvent, and thus the resin is clearly visible through the clear liquid. In FIG. 4B, the resin is in a poor solvent, and thus is dispersed, but the dispersion is cloudy. In FIG. 4C, the resin is in a good solvent, is completely dissolved, and the solution is clear. Suitable solvents are poor solvents for the resin or polymer, as characterized by FIG. 4B. Suitable solvents include mineral spirits, including odorless mineral spirits, white spirits (petroleum derived liquids) such as SPIRDANE© D25 and SPIRDANE® D40 white spirit, and VM&P naptha (hydrotreated light naphtha).

Polymer chemists describe solvents, with respect to a given polymer, at a given temperature, as athermal solvents, good solvents, theta solvents, poor solvents, and non-solvents (Rubinstein & Colby, Polymer Physics, 2003, Oxford University Press, pages 100-103. Athermal solvents and theta solvents are theoretically important but need sophisticated techniques such as static light scattering and intrinsic viscometry to distinguish among athermal, theta and good solvents. For a practical system, athermal and theta solvents are both considered good solvents. A good solvent is characterized by strong interactions between solvent and polymer, so that it is energetically favorable for the solvent to interact with the polymer. The solvent molecules begin to swell and dissolve the polymer particles and eventually a true solution is achieved. A molecule is dissolved if it is surrounded, on a molecular level, by solvent molecules only—it is diffusing among solvent molecules. It is not touching other molecules of the same type, or for polymers, other parts of the same molecule. Molecules are very small and the human eye will not detect scattered light if the molecules are all fully dissolved and diffusing. A clear solution, such as in FIG. 4A, indicates a true molecular solution, in polymer science terms, that the solvent is a good solvent for that polymer, in which we group, for practical applications, athermal and theta solvents.

Non solvents are those solvents that do not dissolve, nor swell, the polymer chains. In this case it is energetically disfavorable for the solvent molecules to interact with the polymer. The solvent often will not wet the polymer particle, and remains clear, with the polymer remaining a distinct, unchanged solid.

"Poor solvents" are thus in between. In this case, the polymer may be partially dissolved. It is changed by contact with the solvent, but does not dissolve completely, thus giving a clear solution.

Generally, the solvent is present at a level of about 10 to 90 weight percent, preferably from 20 to 70 and most preferably from 35-40 weight percent of the surface retarder formulation.

The in-form surface retarder can be applied to one or more inner surfaces of the form or mold, such as in the same manner as architectural paints. For example, application can be carried out with rollers, such as rollers made from foam, fabric, non-woven polyester, rubber or other materials. For large areas or detail work, spraying is most convenient. Spray equipment often uses compressed air to generate pressure for the spray, or airless (piston) types. Nozzles that generate the fine spray have various spray patterns, and are chosen to meet the product and application. Typical geometries are fan or cone. The in-form surface retarder can also be applied to forms or molds using a brush, trowel or foam hand applicators. Suitable application rates include 200-600 ft$^2$/gallon, preferably 300-500 ft$^2$/gallon, more preferably 350-450 ft$^2$/gallon.

In some embodiments, ideal drying times for the surface retarder formulation are 15 minutes to 1 hour. Given the variation in atmospheric conditions such as temperature, humidity and wind velocity, drying times can range to several hours or overnight. Visual and/or tactile (the formulation is no longer soft or tacky) inspection will indicate when drying is complete.

Any type of cementitious material that is suitable for the application may be used, including concrete and mortar. A preferred concrete mix design has 600-800 lbs/yd$^3$ cementitious, and workability ranging from 0 inches of slump to 30 inches of slump flow (slump and slump flow are defined in ASTM C143 and ASTM C1611M-14). In certain embodiments, the concrete should be consolidated as appropriate for the workability. Typical consolidation techniques include vibration tables, screeding, or concrete vibrators (also known as stingers.)

Any type of mold can be used that is typically used for pre-cast concrete, such as wood, steel, fiberglass, plastics or urethanes. The concrete may be left in the form work from 1 hour to several days before demolding. Typical concrete strengths at demolding are 2500 to 4000 PSI, depending on the shape, size and reinforcement of the concrete article or part, as determined by the engineering specifications.

During demolding, the in-form surface retarder will typically be divided unevenly between the concrete and the mold, with the greater fraction of the in-form surface retarder on the concrete. Removal of the in-form surface retarder from the concrete to reveal the light etch in accordance with embodiments disclosed herein can be achieved by power washing with water (e.g., a pressurized jet of water, typically used at water jet pressures ranging from about 50 to about 200 kg/m$^2$), or brushing and vacuuming.

Removal of residual in-form surface retarder from the form may be done by brushing or light scraping. In some cases, a light sander may be used.

In certain embodiments, the surface retarder formulation is devoid of vegetable oil and derivatives, animal oil and derivatives, alkyl-ester-of-hydroxycarboxy compounds, and/or bitumen emulsions.

While the embodiments described herein include a limited number of embodiments, these specific embodiments are not intended to limit the scope as otherwise described and claimed herein. Modification and variations from the described embodiments exist. More specifically, the following examples are given as a specific illustration of embodiments disclosed, and it should be understood that the embodiments disclosed are not limited to the specific details set forth in the examples.

Example 1A

The solubility of acids in water was evaluated by stirring the amount shown in Table 1 below in 100 mL of water at 25° C. for 14 hours. The mixture was allowed to settle and the saturated aqueous solution of acid was decanted. Concentration was measured by Total Organic Carbon using a TOC-L CSH/CSN by Shimadzu. A calibration curve is generate based off a four point calibration of 0 ppm, 25 ppm, 50 ppm, and 100 ppm carbon. Samples are then diluted to a predetermined dilution factor. 20 mL of the diluted samples are acidified to a pH of ~2-3 with hydrochloric acid. Samples are run based off the calibration curve performing two 50 uL injections each to determine the total organic carbon of the sample.

The oxygen-to-carbon ratio was calculated by dividing the number of oxygen atoms by the number of carbon atoms in the structures.

TABLE 1

| acid name | amount used in test (g) | Solubility (g/100 g) | O/C ratio |
|---|---|---|---|
| Phthalic Acid | 5 | 1 | 0.5 |
| Mesaconic Acid | 5 | 3 | 0.8 |
| Methymalonic Acid | 5 | 5 | 1.0 |
| Adipic Acid | 5 | 2 | 1.0 |
| Succinic Acid | 50 | 7 | 1.0 |
| Citraconic Acid | 50 | 29 | 0.8 |
| Itaconic Acid | 50 | 8 | 0.8 |
| Oxalic Acid | 50 | 9 | 2.0 |
| DL-Tartaric Acid | 50 | 13 | 1.8 |
| Glutaric Acid | 50 | 36 | 0.8 |
| D Tartaric Acid | 50 | 32 | 1.8 |
| L Tartaric Acid | 50 | 33 | 1.8 |
| Malonic Acid | 50 | 33 | 1.3 |

Example 1B

Each acid was dissolved at 1% by weight in a 2% by weight KOH solution. Thirty grams of solution was exposed to 3 g of Type I/II cement in a tube, and mixed on a tube rotator for 10 min @ 30 rpm. The resulting slurry was centrifuged for 1 min at 4000 rpm to separate the cement and adsorbed compounds from the soluble species. The soluble portion was filtered with a 0.2 micron syringe filter and then analyzed by ion chromatography using an ICS-2100 RFIC by Dionex with single point calibration with a standard at 100 ppm. Samples and standards were prepared in 50 mM KOH solution. Samples' dilutions were adjusted to be within calibration range. Data analysis run through peak area integration.

The cement binding is expressed as a percent of the species present that absorbed to the cement.

TABLE 2

| | % adsorbed |
|---|---|
| Oxalic acid | 94.8 |
| DL-Tartaric acid | 31.6 |
| D Tartaric acid | 29.1 |
| L Tartaric acid | 21.5 |
| Itaconic acid | 7.3 |
| Methylmalonic acid | 7.0 |
| Succinic acid | 6.4 |
| Malonic acid | 6.3 |
| Citraconic acid | 1.9 |
| Adipic acid | 1.1 |
| Phthalic Acid | 0 |
| Mesaconic Acid | 0 |
| Glutaric acid | 0 |

Example 2

The quality of the in-form retarder made from each of the acids of Example 1 was evaluated. Each was used to make an in-form surface retarder by combining the materials shown below, in the order listed, in a Silverson-high shear rotor-stator mixer at 5000 rpm, and mixing for 10 minutes after the final addition.

| Weight by grams | Component |
|---|---|
| 38 | Odorless Mineral Spirits from Jasco |
| 29 | K 10 Resin from DRT of Dax France |
| 4 | Lanolin |
| 3 | DUOMEEN ® TDO dispersing agent |
| 0.2 | polydimethyl siloxane (HS 1000) |
| 5.8 | Titanium dioxide |
| 1 | Fumed silica HTK t-30 |
| 11 | Precipitated silica |
| 8 | DL tartaric acid (as received from Aldrich) |

The exemplary in-form surface retarder was roller applied in rectangles on a wood form at a rate of 400 ft$^2$/gallon and allowed to dry for 2 hours at 72° F.

A concrete mix was then batched as follows: 705 lbs./yd$^3$ Cement (Type II White), 1630 lbs./yd$^3$ Stone, 1400 lbs./yd$^3$ Sand, and 288 lbs./yd$^3$ Water. To obtain flowable concrete, ADVA® CAST 575 superplasticizer available from GCP Applied Technologies, which is commonly used in precast, was added at 5 oz./100 lbs. of cement in a yd$^3$ of concrete. After mixing all these batched materials together for 9 minutes, the slump flow (ASTM 1611M-14) was measured at 26" spread, typical of Self-Consolidating Concrete.

The concrete was poured into the wood form which has the surface retarder paint applied. The concrete was allowed to dry and cure without covering for 22 hours at a temperature of 90° F.

After 22 hours of curing, the concrete was removed from the wood mold and sprayed with high pressure water from a 1900 psi pressure washer to remove the in-form surface retarder and retarded cement paste. Washing continued until water was running clear and no further cement paste is removed (this process removes whatever cement paste that has not hardened to the surface of the concrete due to the retarding effects of the acids tested). Evaluation of the resulting etches are shown in Table 3, based on a comparison to the etches shown in FIG. 1.

TABLE 3

| Acid name | Etch depth |
|---|---|
| Phthalic Acid | Very light to none |
| Mesaconic Acid | Very light to none |
| Methymalonic Acid | Very light to none |
| Adipic Acid | Lighter than optimum, not even |
| Succinic Acid | Lighter than optimum, not even |
| Citraconic Acid | Lighter than optimum, not even |
| Itaconic Acid | just right, light etch showing sand textures |
| Oxalic Acid | just right, light etch showing sand textures |
| DL-Tartaric Acid | just right, light etch showing sand textures |
| Glutaric Acid | just right, light etch showing sand textures |
| D Tartaric Acid | too deep, coarse aggregates visible |
| L Tartaric Acid | too deep, coarse aggregates visible |
| Malonic Acid | too deep, coarse aggregates visible |

Figure 2:
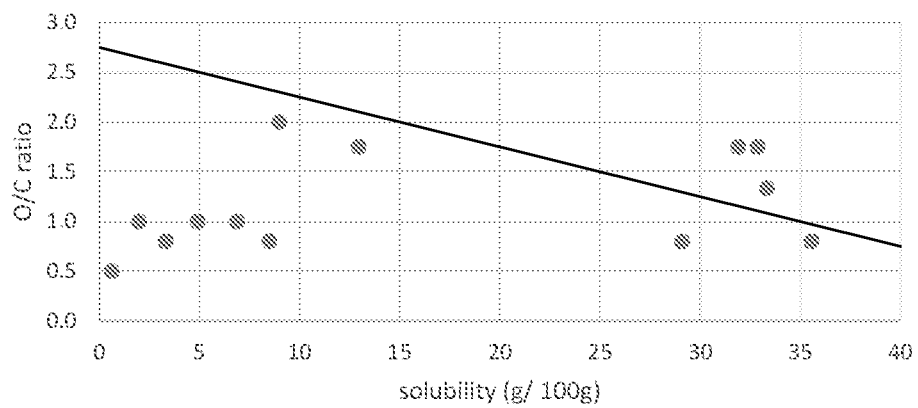
FIG. 2 is a graph of solubility and oxygen to carbon content of various organic diacid compounds.

As shown in FIG. 2, the solubility and oxygen-to-carbon ratio are graphically plotted based on the data set forth in Table 1 above. Surface retarder active agents which demonstrated too deep of an etch, according to Table 3, produced data points which appeared in the graph below the line y=−0.075x+3.2. The surface retarder active agents which demonstrated too light an etch, according to FIG. 3, produced data points appear in the graph above the line y=−0.075x+2. Thus, in exemplary embodiments of the present invention, the surface retarder active compounds demonstrating the ideal balance between solubility and oxygen-to-carbon ratio fall between the lines mentioned above (see FIG. 3)

Figure 3:
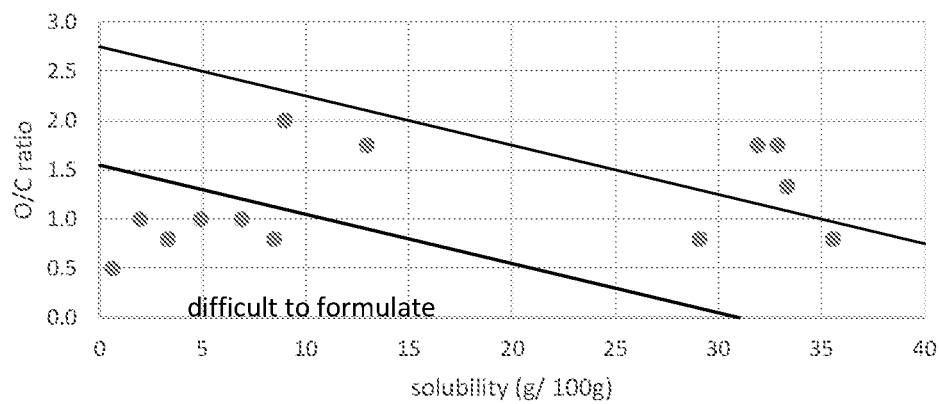
FIG. 3 is a graph of solubility and oxygen to carbon content of various organic diacid compounds.
Figure 4:
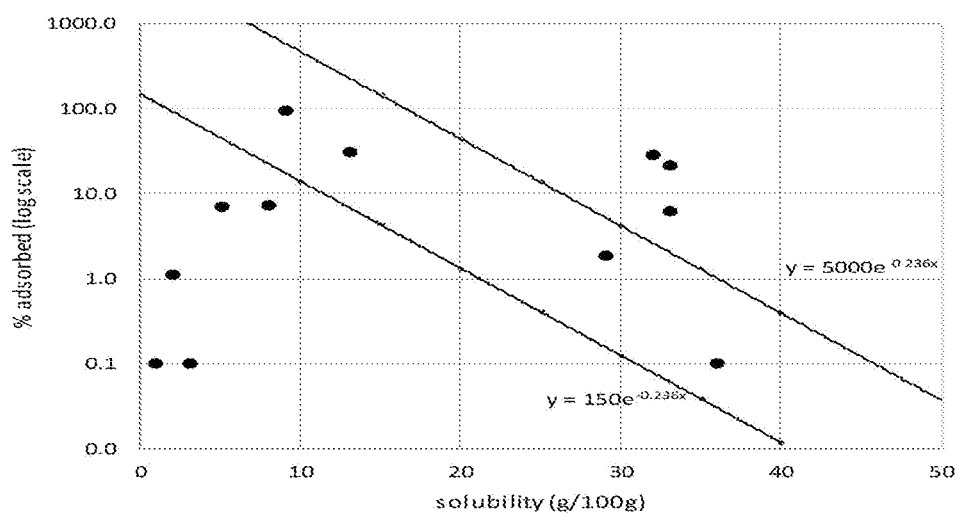
FIG. 4 is a graph of percent absorption (vertical axis) onto cement of various organic diacid compounds as a function of solubility (horizontal axis)
Figures 5A, 5C:
FIGS. 5A, 5B and 5C are digital photographs of resin in a non-solvent, a poor solvent and a good solvent, respectively.
Figure 5B:

Comparing the results of Table 2 and Table 3, it can be seen in FIG. 4 the log of cement absorption and solubility shows the same pattern as FIG. 3. The acids that provide the desired light etch fall closer to the origin than the line $y=5000e^{-0.236x}$ on FIG. 4, The materials that fall above the upper line provide a very deep etch are very difficult to formulate into workable products—the etch is patchy, following the location of the grains of acid. It is better to have more, more evenly distributed weaker etch materials. Examples of acids that result in etching closer to the origin are oxalic acid, D,L-tartaric acid, citraconic acid, glutaric acid, phthalic acid, mesaconic acid, methylmalontic acid, adipic acid, succinic acid and itaconic acid.

Although it is likely possible to formulate the very weak etching materials to a workable in-form retarder, there is a preferred region where the etch is light, but not so much acid needs to be used. These materials are described as below the upper line in FIG. 4, but above the lower line, $y=150e^{-0.236x}$. Examples of materials that fall between these lines, and are particularly preferred are oxalic acid, D,L-tartaric acid, citraconic, glutaric acid, aconitic acid and boric acid.

Example 3

A mixture of D-tartaric acid and L-tartaric acid was used and compared to the individual enantiomers and the racemic co-crystal formed when synthetic tartaric acid is made, using the same procedure as in Example 2. The results are shown in Table 3:

TABLE 3

| Acid | Etch depth |
|---|---|
| DL-Tartaric Acid | just right, light etch showing sand textures |
| D-Tartaric Acid | too deep, coarse aggregates visible |

TABLE 3-continued

| Acid | Etch depth |
|---|---|
| L-Tartaric Acid | too deep, coarse aggregates visible |
| 50/50 D-tartaric and L-tartaric | too deep, coarse aggregates visible |

Example 4

The solubility of resin in various organic solvents was evaluated by observation. A small amount of resin (0.2 g) was placed in a vial with 3 mL of the solvent. Observations were made immediately, after two hours and thirty minutes, and after 15 hours. Table 4 below shows the observations of solubility.

TABLE 4

| Solvent | t = 0 | t = 2.5 hr | t = 15 hr |
|---|---|---|---|
| Odorless Mineral Spirits (Jasco) | Wets, cloudy | Cloudy, opaque | Cloudy, opaque |
| Spirdane ™ D25 | Wets, cloudy | Cloudy, opaque | Cloudy, opaque |
| Spirdane ™ D40 | Wets, cloudy | Cloudy, opaque | Cloudy, opaque |
| VM&P Naphtha | Wets, cloudy | Cloudy, opaque | Cloudy, opaque |
| Turpentine | Wets, cloudy | Dissolved, very lightly cloudy | Dissolved, very lightly cloudy |
| Paint Thinner | Wets, cloudy | Cloudy, opaque | Cloudy, opaque |
| Xylene | Starting to dissolve | Clear, fully soluble | Clear, fully soluble |
| Methyl Ethyl Ketone | Starting to dissolve | Clear, fully soluble | Clear, fully soluble |
| Butyl Acetate | Starting to dissolve | Clear, fully soluble | Clear, fully soluble |
| Lacquer Thinner | Starting to dissolve | Clear, fully soluble | Clear, fully soluble |
| Japan Drier | Wets, cloudy | Crumbling, not cloudy | Mostly dissolved, a few particles |

Example 5

Solvents were evaluated by diluting each sample 1:100 in ethanol and analyzing by gas-chromatography/mass spectroscopy, using an Agilent 7890A gas chromatograph and an Agilent 5975C mass spectrometer. Chromatographs were obtained with the injector temp set at 280 C, using a splitting ratio of 50:1 and an injection volume of 1 microliter. The column was 30 m×0.25 mm×025 microns. The initial temperature of 50° C. was held for 4 minutes, followed by an 8 deg C./min ramp to 270° C.—the final temperature was held for 10 minutes.

The range of retention times is shown in Table 5. The objective light etch can only be obtained by poor solvents with a range of retention times less than 7 minutes.

TABLE 5

| Solvent | Result | Resin solubility | BP | | Retention time (minutes) | Range of retention times |
|---|---|---|---|---|---|---|
| Meets Objective | Odorless Mineral Spirits (Jasco) | Light etch with no exposed coarse aggregate | Cloudy opaque suspension | 159-179 | 20 5.0-11 | 6 |
| Meets Objective | Spirdane™ D25 | Light etch with no exposed coarse aggregate | Cloudy opaque suspension | 141-164 | 23 3-9 | 6 |
| Meets Objective | Spirdane™ D40 | Light etch with no exposed coarse aggregate | Cloudy opaque suspension | 150-205 | 55 5-12 | 7 |
| Meets Objective | VM&P Naphtha | Light etch with no exposed coarse aggregate | Cloudy opaque suspension | 129-144 | 45 3.3-6.5 | 3.2 |
| Comparative | Turpentine | Exposed coarse aggregate | Dissolved, a little cloudy | 156-176 | 20 6.8-16.7 | 9.9 |
| Comparative | Paint Thinner | Exposed coarse aggregate | Cloudy opaque suspension | 159-196 | 37 5.0-13 | 8 |
| Comparative | Xylene | Exposed coarse aggregate | Dissolved | 138-142 | 4 Single peak | 0 |
| Comparative | Methyl Ethyl Ketone | Exposed coarse aggregate | Dissolved | 79.4 | Single peak | 0 |
| Comparative | Butyl Acetate | Exposed coarse aggregate | Dissolved | 124-126 | 2 Single peak | 0 |
| Comparative | Lacquer Thinner | Exposed coarse aggregate | Dissolved | 62-65 | 3 1.46-3.19 | 1.6 |
| Comparative | Japan Drier | Exposed coarse aggregate | Few crumbs | | 5.9-13 | 7.1 |

Example 6

The procedures of EXAMPLE 1A (solubility), EXAMPLE 1B (cement binding) and EXAMPLE 2 (evaluating quality of the coating) were followed in generating another exemplary set of organic and inorganic molecules. The results are shown below in TABLE 6. The solubility of boric acid was measured using the Ion Chromatography of method 1B, rather than TOC.

TABLE 6

| Blank | solubility | % binding to cement | surface etch |
|---|---|---|---|
| L-Leucine | 1.9 | 11 | very light to none |
| Ethylenediamine-tetraacetic | 0.0 | 36 | very light to none |
| DL-Leucine | 1.1 | 88 | very light to none |
| 12-Aminododecanoic Acid | 0.2 | 90 | very light to none |
| trans-Aconitic Acid | 22.3 | 5 | just right, light etch showing sand textures |
| Boric Acid by ICP | 6.0 | 100 | just right, light etch showing sand textures |
| D-(+)-Glucose | 50.0 | 100 | too deep, coarse aggregates visible |

Figure 6:
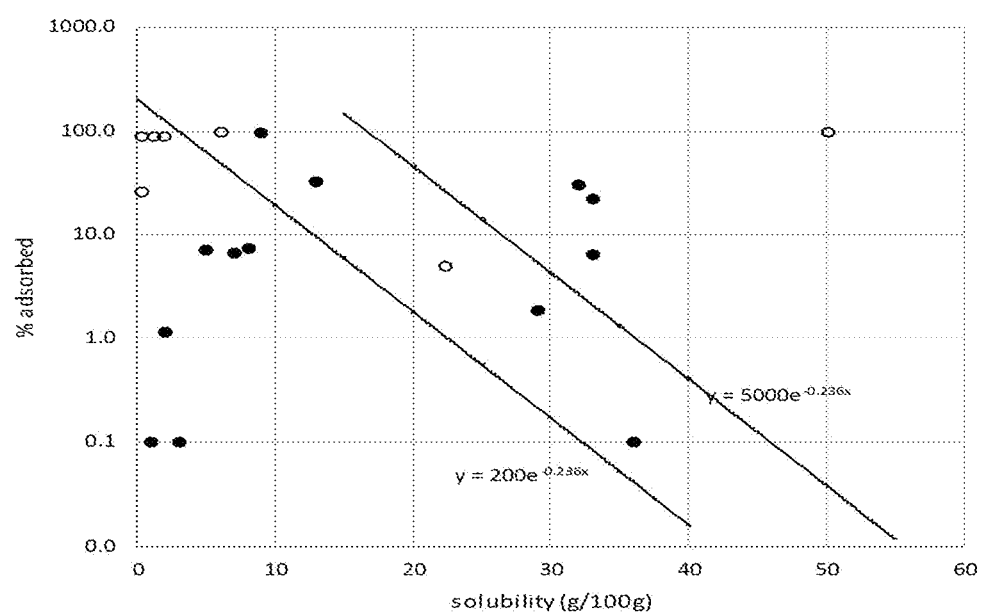
FIG. 6 is a graph of percent absorption (vertical axis) onto cement of various compounds, including various organic diacid compounds and other organic and inorganic cation-binding compounds, as a function of solubility (horizontal axis).

These molecules, although not incorporating or based upon use of an organic diacid or diacids, demonstrated that an etch similar to using an acid wash could be achieved in a concrete surface using a correct balance of solubility and cement binding properties. In other words, the etch was not overly deep or too light. In FIG. 6, the inventors provide a graphic illustration of solubility (horizontal axis) plotted against cement binding (plotted as log along vertical axis) wherein circles are used to illustrate the effect of various non-organic diacid compounds. The filled in dots represent the solubility and cement binding values of organic diacid compounds.

The foregoing examples and embodiments are provided for illustrative purposes only and not intended to limit the scope of the invention.

What is claimed is:

1. A surface retarder composition comprising a resin or polymer having an acid number of greater than 100 mg KOH/g of resin or polymer,
   a. an aliphatic solvent that is a poor solvent for said resin, such that the resin or polymer is partially dissolved;
   b. at least one surface retarder active agent having solubility and cement binding values, which, when plotted with solubility value in grams of solute per 100 g of water on the x-axis and cement binding value as a percentage on the y-axis and displayed in log scale, lie closer to the origin than the line $y=5000e^{-0.236x}$, wherein the resin or polymer having an acid number of greater than 100 mg KOH/g of resin or polymer is present in the composition at from 25 to 30 percent by weight of the composition.

2. The surface retarder composition of claim 1, wherein the solvent is chosen from mineral spirits, white spirits, and VM&P naptha.

3. The surface retarder composition of claim 1, wherein the solvent is chosen from odorless mineral spirits.

4. The surface retarder composition of claim 1, wherein the at least one surface retarder active agent has solubility and cement binding values, which, when plotted with solubility in grams of solute per 100 g of water on the x-axis and cement binding as a percentage on the y-axis, lie above the line $y=200e^{-0.236x}$.

5. The surface retarder composition of claim 1, wherein the at least one surface retarder active agent comprises at least one organic diacid compound chosen from oxalic acid, D,L-tartaric acid, citraconic acid, glutaric acid, phthalic acid, mesaconic acid, methylmalontic acid, adipic acid, succinic acid, itaconic acid, and combinations thereof.

6. The surface retarder composition of claim 1, wherein the at least one surface retarder active agent is chosen from oxalic acid, D, L-tartaric acid, citraconic acid, glutaric acid, aconitic acid, boric acid, and combinations thereof.

7. The surface retarder composition of claim 1, wherein the at least one surface retarder active agent comprises at least one organic diacid compound that is a co-crystallized 1:1 mixture of L-tartaric and D-tartaric acid.

8. The surface retarder composition of claim 1, wherein the resin is a dimerized or polymerized gum rosin.

9. The surface retarder composition of claim 1, wherein the resin is a plant-based resin.

10. The surface retarder composition of claim 1, wherein the at least one surface retarder active agent is at least one organic diacid compound, which, when plotted with solubility in grams of solute per 100 g of water on the x-axis and oxygen-to-carbon ratio on the y-axis, lies closer to the origin than the line $y=-0.075x+3.2$.

11. The surface retarder composition of claim 1 wherein the at least one surface retarder active agent is at least one organic diacid compound having solubility and oxygen-to-carbon ratio values, which, when plotted with solubility in grams of solute per 100 g of water on the x-axis and oxygen-to-carbon ratio on the y-axis and displayed in log scale, lies further from the origin than the line $y=-0.075x+2$.

* * * * *